United States Patent [19]

Center et al.

[11] Patent Number: 5,554,221
[45] Date of Patent: Sep. 10, 1996

[54] APPARATUS FOR DISPENSING PORTIONS OF MATERIAL

[75] Inventors: John L. Center; Patrick J. Bierschenk, both of Dallas, Tex.

[73] Assignee: Recot, Inc., Plano, Tex.

[21] Appl. No.: 262,905

[22] Filed: Jun. 21, 1994

Related U.S. Application Data

[62] Division of Ser. No. 989,362, Dec. 11, 1992, Pat. No. 5,353,959.

[51] Int. Cl.⁶ .................................................. A23G 3/00
[52] U.S. Cl. ............................. 118/19; 118/22; 118/25; 118/418; 366/227; 366/228
[58] Field of Search ................................ 118/19, 22, 24, 118/25, 31, 418; 366/227, 228, 229; 134/65, 132; 198/535, 536; 414/325, 304; 99/494

[56] References Cited

U.S. PATENT DOCUMENTS

| | | |
|---|---|---|
| 148,800 | 3/1874 | Baker . |
| 943,204 | 12/1909 | Treischman et al. . |
| 1,544,765 | 7/1925 | Lawrence . |
| 1,550,656 | 8/1925 | Anderson et al. ................. 366/228 |
| 1,748,543 | 2/1930 | Devlin . |
| 1,754,846 | 4/1930 | Bausman . |
| 1,803,521 | 5/1931 | Bergerioux . |
| 1,808,696 | 6/1931 | Van Houten . |
| 2,136,118 | 11/1938 | Palmer . |
| 2,148,022 | 2/1939 | Haaland . |
| 2,165,068 | 7/1939 | Protzeller . |
| 2,228,595 | 1/1941 | Finch . |
| 2,432,852 | 12/1947 | Arvidson . |
| 2,495,906 | 1/1950 | Porter . |
| 2,764,392 | 9/1956 | Fisher ................................. 366/228 |
| 2,799,242 | 7/1957 | Cain . |
| 2,893,332 | 7/1959 | Roser et al. . |
| 2,902,188 | 9/1959 | Tarukawa . |
| 3,129,114 | 4/1964 | Kindman . |
| 3,152,010 | 10/1964 | Case . |
| 3,228,557 | 1/1966 | Maddocks . |
| 3,263,592 | 8/1966 | Hickey et al. . |
| 3,265,227 | 8/1966 | Vratil et al. . |
| 3,283,740 | 11/1966 | Fredrickson . |
| 3,537,406 | 11/1970 | Ori . |
| 3,570,569 | 3/1971 | Hartley et al. . |
| 3,752,445 | 8/1973 | Nowak ................................ 366/227 |
| 3,820,394 | 6/1974 | Martin . |
| 3,911,860 | 10/1975 | Nohynek ............................ 118/25 |
| 3,955,529 | 5/1976 | Reed .................................. 118/19 |
| 4,044,926 | 8/1977 | Allen . |
| 4,245,581 | 1/1981 | Spencer . |
| 4,444,509 | 4/1984 | Skiner et al. ...................... 366/227 |
| 4,445,628 | 5/1984 | Cain . |
| 4,498,635 | 12/1985 | Fielding . |
| 4,527,714 | 7/1985 | Bowman . |
| 4,543,180 | 9/1985 | Riker ................................. 366/228 |
| 4,597,358 | 7/1986 | Aitken . |
| 4,632,280 | 12/1986 | Mawby et al. . |
| 4,976,378 | 12/1990 | Bush . |
| 5,050,770 | 9/1991 | Smiley . |
| 5,074,435 | 12/1991 | Suverkrop et al. . |
| 5,090,593 | 2/1992 | Ejike ................................. 118/19 |

Primary Examiner—W. Gary Jones
Assistant Examiner—Laura E. Edwards
Attorney, Agent, or Firm—Rothwell, Figg, Ernst & Kurz

[57] ABSTRACT

A system and apparatus for producing seasoned food products where seasoning is performed at individual packaging lines. The product is conveyed from the preparation area to a packaging area in an unseasoned condition. Upon reaching the packaging lines, which are disposed in packaging departments in the packaging area, the product can be selectively seasoned independent of other packaging lines. After seasoning, the product is packaged and prepared for delivery. At each packaging line, a volumetric feeder includes a feed head that cooperates with a tumbler having helical flights to produce continuous controlled product portions. A seasoning dispenser is positionable within the tumbler and can be adjusted to dispense a given weight of seasoning at a given rate, based on the amount of product passing through the tumbler, to obtain consistent seasoning levels and coverage. The ability to produce separate product types at each packaging line yields superior plant scheduling flexibility due to more packaging possibilities than a system which delivers already seasoned product to the packaging lines.

14 Claims, 10 Drawing Sheets

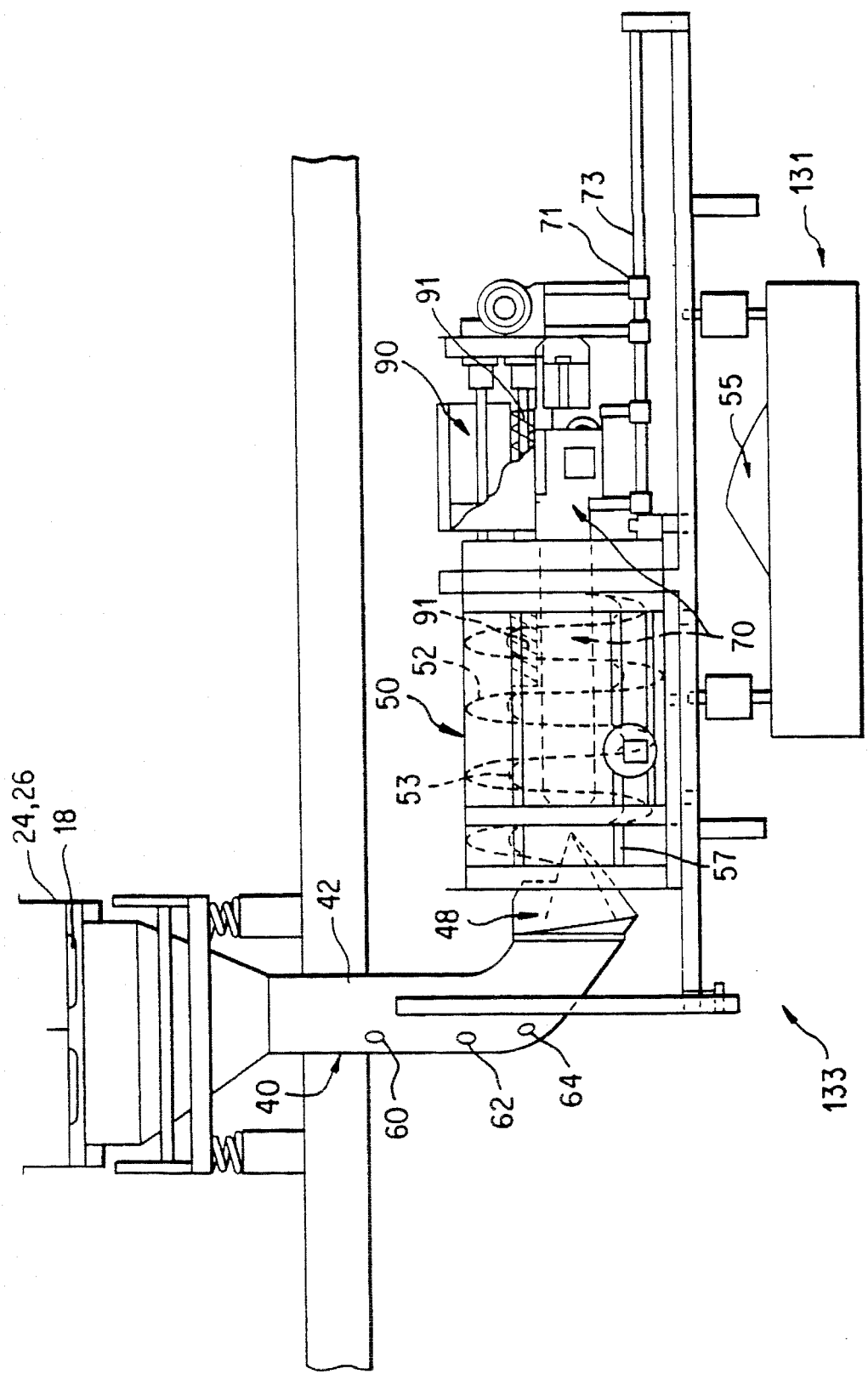

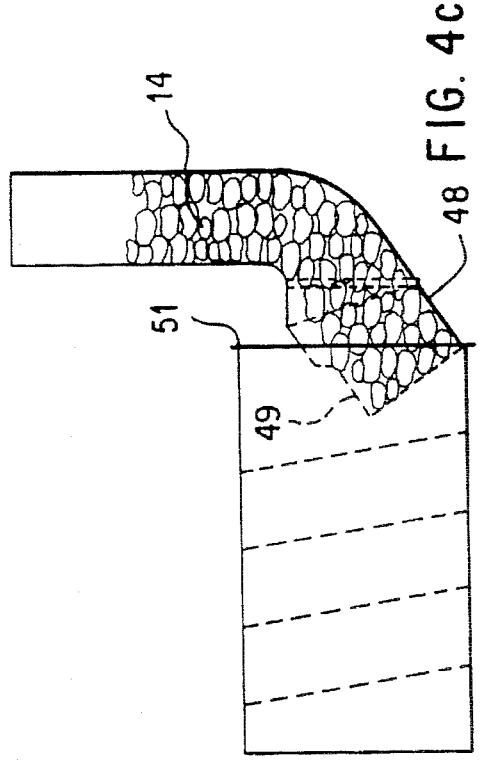
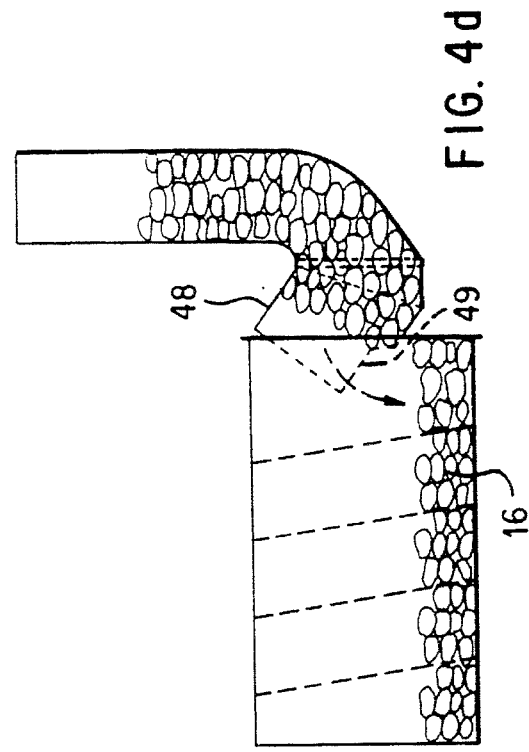
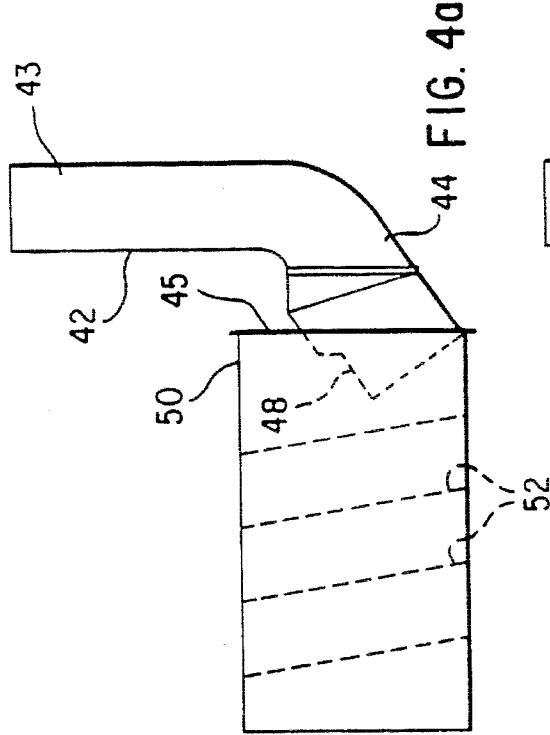
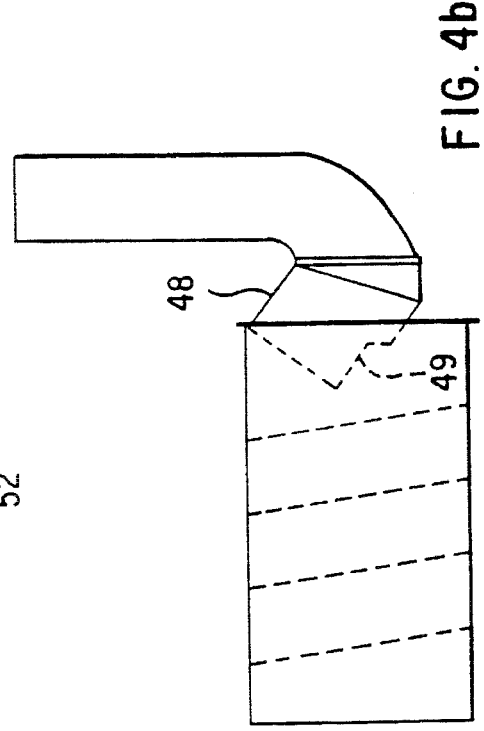
FIG. 4a
FIG. 4b
FIG. 4c
FIG. 4d

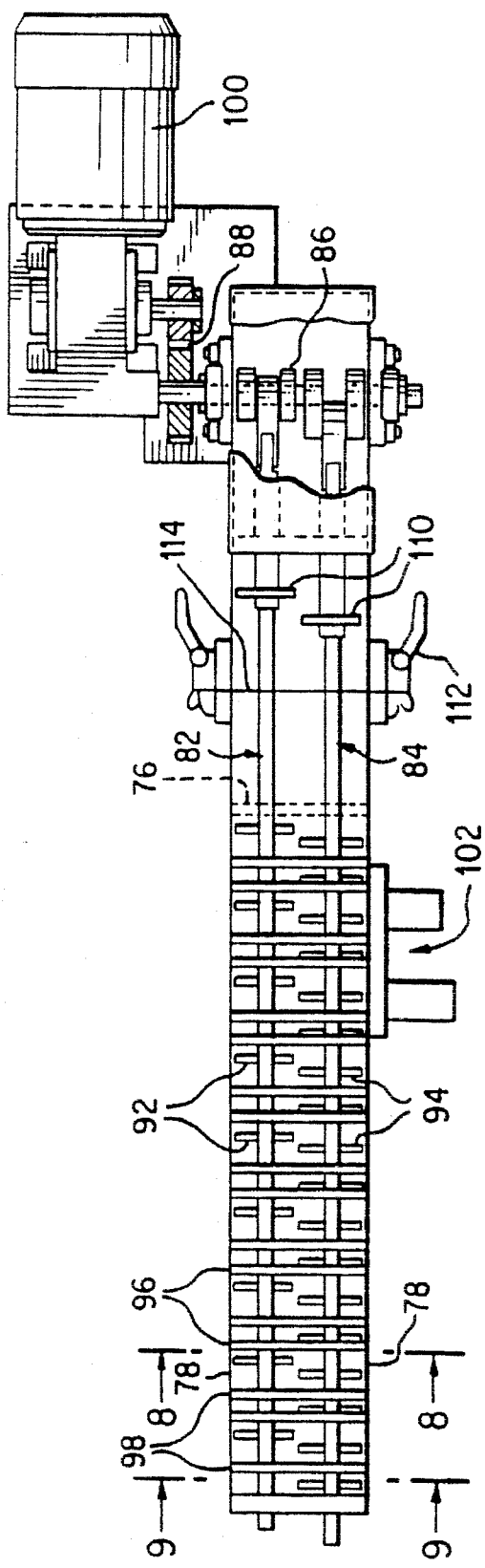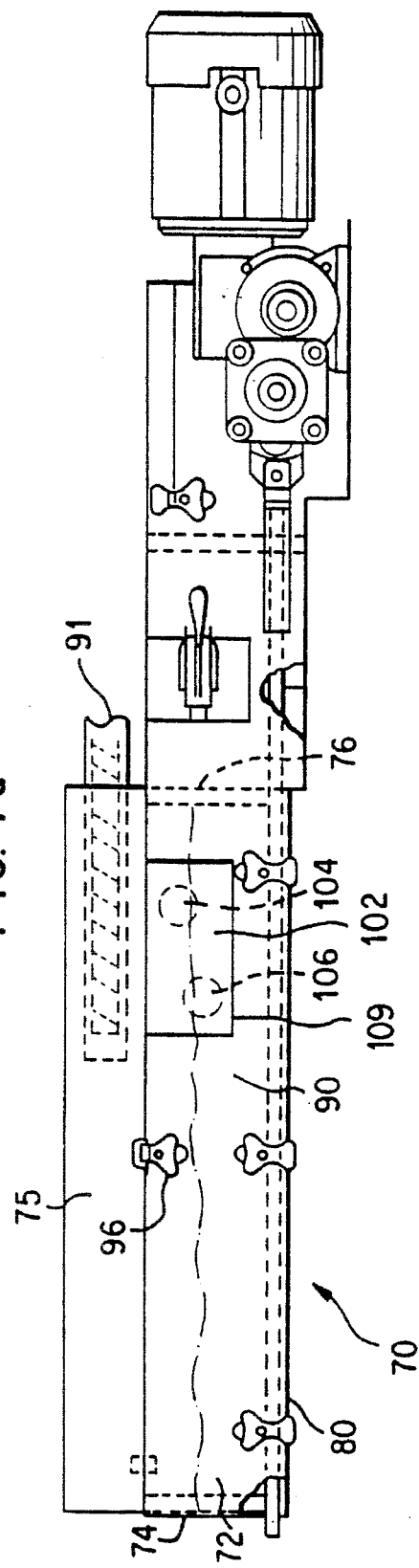
FIG. 7a
FIG. 7b

APPARATUS FOR DISPENSING PORTIONS OF MATERIAL

This application is a divisional of application Ser. No. 07/989,362 filed Dec. 11, 1992, now U.S. Pat. No. 5,353,959.

FIELD OF THE INVENTION

The present invention relates to a method of and apparatus for seasoning food products. Specifically, the present invention relates to methods and apparatus which provide improved seasoning control and increased manufacturing capacity in a system for producing seasoned snack food products.

DESCRIPTION OF THE PRIOR ART

It is known in the prior art to produce seasoned food product by conveying cooked product to a large rotating tumbler in which the product is coated with seasoning, e.g. powdered seasoning, by appropriate application and mixing and agitating procedures. From this large tumbler, the seasoned product is conveyed and distributed to a packaging area including a number of packaging departments. Each packaging department has a plurality of packaging lines, with each packaging line including a weighing device and a bagmaking device that produce bags or pouches filled with a specific amount of the product. The product output from the seasoning tumbler, which is located in the cooking or kitchen area, is typically transported to the packaging area by transfer conveyors. The transfer conveyors deliver the product to distribution loop conveyors which distribute the seasoned product to the packaging lines of different packaging departments. The distribution conveyors are equipped with slide gates that control the transfer of product from the distribution conveyors to the packaging lines. Product passes through the slide gates to a cross feeder which carries the product to the statistical weigher device of each packaging line. The weigher apportions the seasoned product into specific amounts, after which the portions are passed to the bagmaking device of each packaging line.

In this system, the distribution conveyors carry the product in the condition in which it will be packaged, i.e. seasoned or unseasoned, to the packaging lines in each packaging department. For example, if there are two distribution conveyors that receive product from the transfer conveyor to supply a packaging area, the packaging lines in the packaging departments in that area are only able to receive the two types of product supplied by the two distribution conveyors. Depending on the particular mix of different bag sizes and seasoned product to be packaged at any given time, it is possible to have several packaging lines which are not utilized. This is because the limitations of having one seasoned product in conjunction with a production requirement or schedule may not optimally use the packaging department capacity even though all product conveyed from the kitchen to the packaging department is being packaged. Production capacity is therefore constrained or is not optimally efficient. It would be desirable to overcome this inactivity of packaging units and increase plant efficiency.

Accordingly, it is an object of the present invention to provide an apparatus and method for producing a seasoned product in which the aforementioned problems are overcome.

SUMMARY OF THE INVENTION

The present invention provides methods and apparatus used in a system for manufacturing seasoned or unseasoned food product in which the food product can be delivered in an unseasoned condition to the packaging area of a food processing plant. The packaging area includes several packaging departments, with each packaging department having a plurality of packaging lines. The product can be delivered to some packaging departments in an unseasoned condition because some or all of the packaging lines therein are provided with means for independent controlled seasoning of the product. For these packaging departments, some or all of the packaging lines can produce any one of various seasoned product types. The problem in the prior art system caused by already seasoned product being supplied to a packaging department, i.e. some packaging lines remain inactive since the size or type package they produce is not needed, is overcome since, in accordance with the present invention, the packaging lines can be configured to receive unseasoned product which can be selectively seasoned at each of the packaging lines in the packaging department. The packaging lines are also capable of improved portioning and seasoning control to produce consistently seasoned product portions.

Other features of the present invention will be apparent from the following description of the preferred embodiments taken in conjunction with the accompanying drawings wherein:

BRIEF DESCRIPTION OF THE DRAWINGS

FIG. 3 is a side view of a seasoning and packaging line according to a first embodiment of the present invention.

FIGS. 4(a)–4(d) are views showing different positions of the seasoning tumbler and feed head of the embodiment shown in FIG. 3.

FIGS. 7(a) and 7(b) are respective top and side views of a seasoning dispenser of the embodiment of FIG. 3.

DETAILED DESCRIPTION OF THE PREFERRED EMBODIMENTS

Figure 1:
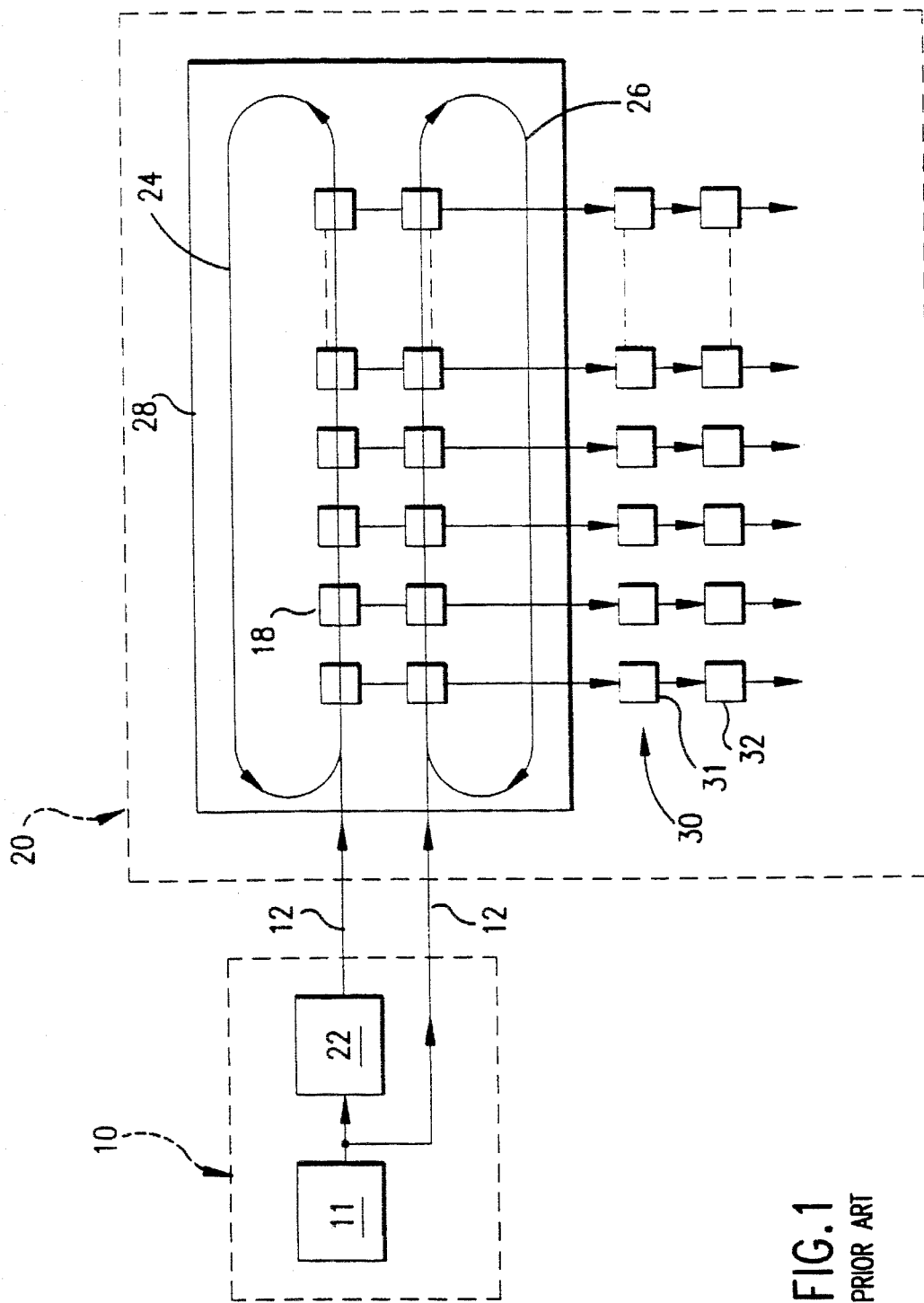
FIG. 1 is a schematic representation of a conventional seasoned food product manufacturing system.

A schematic representation of the layout of a conventional food processing plant is shown in FIG. 1 and generally includes a product cooking or preparation area 10 and a packaging area 20. The product is prepared in the area 10, e.g. by being cooked in a kitchen 11, and then is coated with a powdered seasoning in a large tumbler 22 by a mixing and agitating procedure. The seasoned product is then carried by transport conveyors 12 to the packaging area 20. As shown, it is possible to use the transport conveyors 12 to also carry unseasoned product to the packaging area 20, which product does not pass through the seasoning tumbler 22 but instead is delivered directly to the packaging area 20. The packaging area 20 has distribution loop conveyors 24, 26 which receive the product from the transport conveyors 12. Two loop conveyors 24, 26 are shown and each carries one product type, e.g. seasoned or unseasoned, for distribution to a plurality of packaging departments 28 (one of which is shown) that include a plurality of packaging lines 30. The distribution conveyors 24, 26 are equipped with slide gates 18 that can be selectively opened to drop product onto a cross feeder (not shown) which delivers the product to the statistical weigher device 31 of each packaging line 30. After passing through the statistical weigher, the product is delivered to a bagmaking device 32 of each packaging line 30. After packaging, the bags of product are conveyed from the packaging lines 30 to an area (not shown) in which they are packed in cases and placed on pallets for delivery.

In the prior art manufacturing system, the product is first cooked in kitchen 11, then seasoned in large tumbler 22, and then conveyed to packaging area 20. The product is carried by transport conveyors 12 to distribution loop conveyors 24, 26, which distribution conveyors feed the packaging departments 28. There are usually several distribution conveyors, typically two, for each packaging department. The use of these conveyors to carry various combinations of seasoned and unseasoned product is determined by the packaging department configuration and the plant operation scheduling requirements. Accordingly, the conventional packaging lines 30 in each packaging department 28 of FIG. 1 must package one of the two types of product as carried by conveyors 24, 26. Because sometimes only certain size packages of a product type are required, it is possible that some packaging lines will not be operated. In other words, some packaging lines will be inactive because these lines package certain bag sizes.

Figure 2:
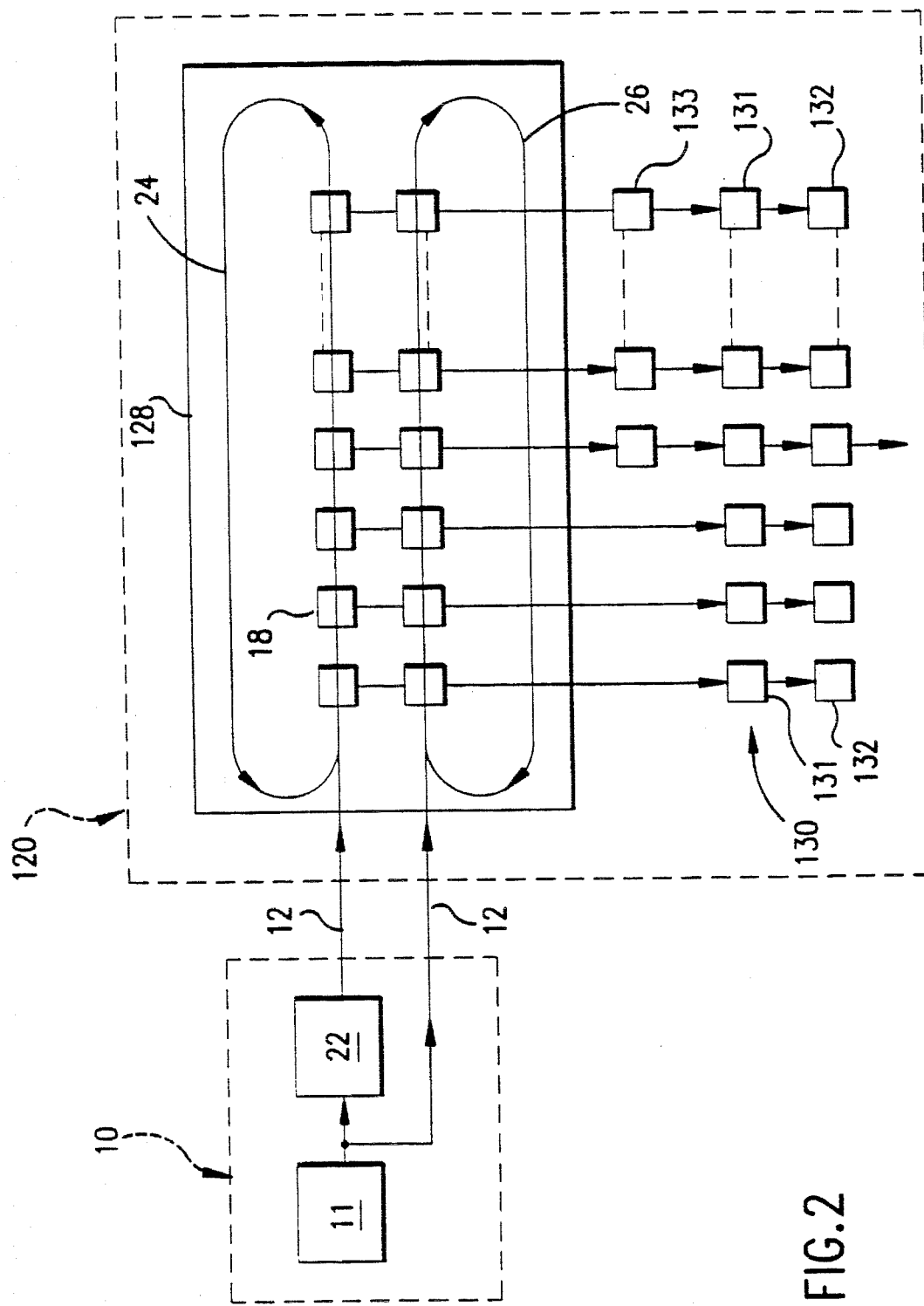
FIG. 2 is a schematic representation of a seasoned food product manufacturing system in accordance with a first embodiment of the present invention.

Pursuant to the embodiment of the present invention, shown schematically in FIG. 2, it is possible to avoid this inactivity of packaging lines by having one or both of the distribution conveyors 24, 26 carry unseasoned product. It is possible to package some of the product in unseasoned condition by delivering the same to conventional packaging lines, and it is also possible to deliver some of the unseasoned product to a packaging department 128 having some packaging lines 130 equipped with means 133 for seasoning the product. While the lines 130 are referred to as packaging lines, it is to be understood that such reference is for clarity and that the lines 130 include means 133 for seasoning the product as well as means 131 and 132 for weighing and packaging the same. If desired, the packaging lines 130 of the present invention can be used to package unseasoned product by not operating the seasoning dispenser component of the packaging line. With the present invention, the packaging lines are not constrained to receive only two product types since some of the lines can be provided with means for independently seasoning product. Accordingly, the problem of packaging line inactivity resulting from the packaging department being "locked in" to receiving specific product types from the distribution conveyors is overcome.

Again referring to FIG. 2, the schematic layout of a first embodiment of the present invention includes a kitchen area 10 and a packaging area 120. The product is cooked or otherwise prepared in the kitchen area 10, after which some of the product can be seasoned. Both the seasoned and unseasoned product are then carried by transport conveyors 12 to packaging area 120 where the product is transferred to distribution conveyors 24, 26 that convey the product to packaging departments 128 (one of which is shown). The already seasoned product can be conveyed by a distribution conveyor to conventional packaging lines for forming bags of that particular product, while the unseasoned product, in accordance with the present invention, can be conveyed to a packaging line or lines 130 having the aforementioned means 133 for producing seasoned product portions. As shown in FIG. 2, a packaging department 128 can include packaging lines 130 with seasoning means 133 and packaging lines 130 without seasoning means 133, the latter units having only product weighing means 131 and packaging means 132. In a preferred embodiment, the means for producing controlled product portions is a volumetric feeder and tumbler and the seasoning means is a dispenser for powdered seasoning which cooperates with the tumbler to provide, as will be discussed below, an improved consistent seasoning dispersion pattern.

FIG. 3 shows a single packaging line 130 having means indicated generally at 133 for seasoning product according to a first embodiment of the present invention. The seasoning means 133 includes a volumetric feeder indicated generally at 40 and a seasoning tumbler 50. The volumetric feeder 40 is shown in FIGS. 4(*a*)–(*d*) and includes a feed chute 42 with an upper end 43 that receives product from the slide gate 18 of distribution conveyors 24, 26, and a lower end 44 connected to a feed head 48. The feed chute 42 is in the form of an open tubular member with a continuous gradually increasing cross-sectional area to prevent product bridging and with a bent lower portion leading to the lower end 44 for engaging the feed head 48. The feed head 48 is provided with a mounting plate 45 which surrounds feed head 48 for attachment thereof to tumbler 50, as will be described below. The lower end 44 of the feed chute 42 is sized and configured to be received in an end of the feed head 48 so as to allow relative rotation between the feed head 48 and the feed chute 42. The lower end 48 of feed chute 42 is slightly telescoped within feed head 48 to prevent product leakage. Preferably, there is no contact between the end 44 of the feed chute 42 and the feed head 48. The feed head 48 and feed chute 42 are sized so as to be spaced from each other while allowing relative rotation therebetween.

Figure 5B:
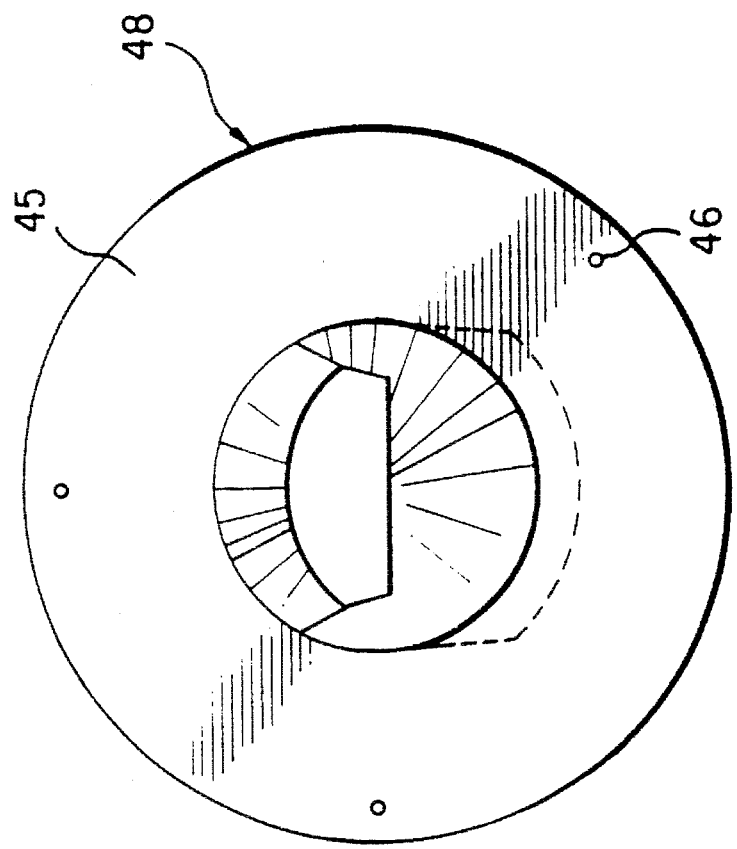
FIGS. 5(a) and 5(b) show a volumetric feed head of the embodiment of FIG. 3.
Figure 5A:
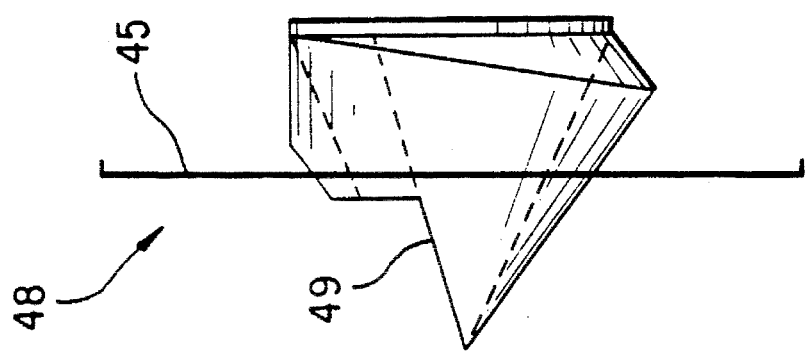
Figure 6B:
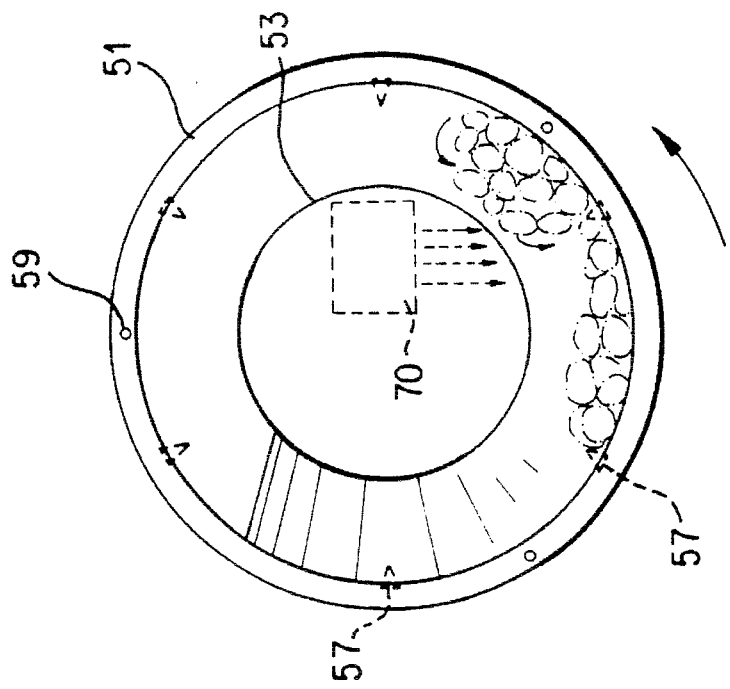
FIGS. 6(a) and 6(b) are respective side and end views of the seasoning tumbler of FIGS. 4(a)–4(d).
Figure 6A:
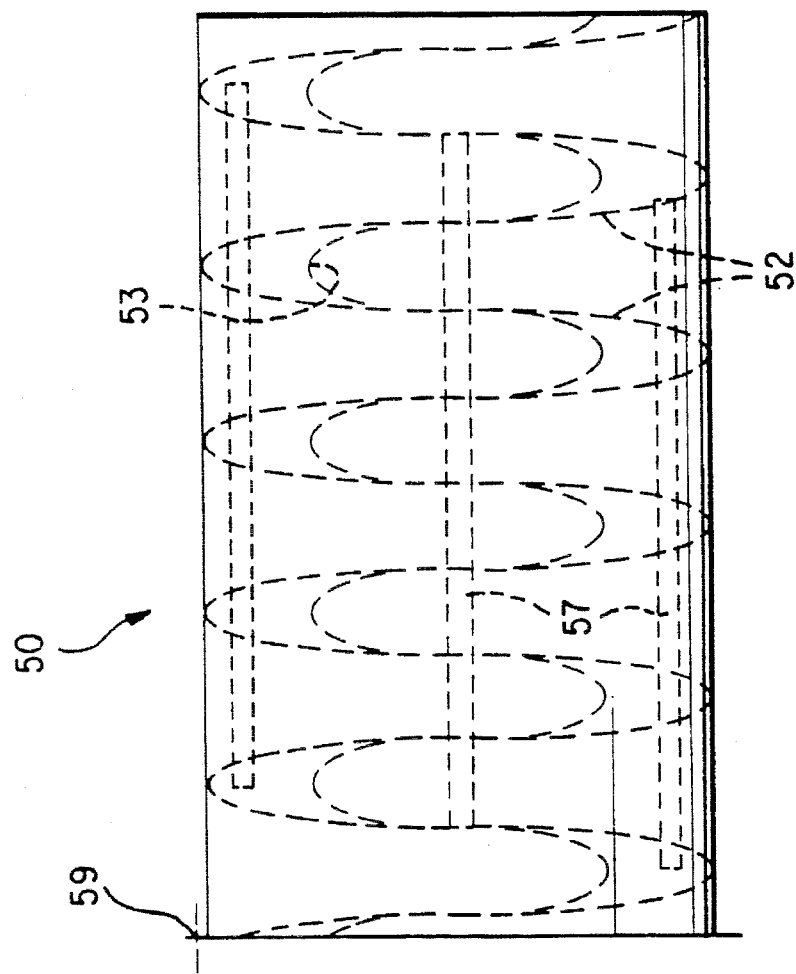

The feed head 48 is connected at an end opposite feed chute 42 to a rotatable seasoning tumbler 50 in a secure but detachable manner so that feed head 48 rotates with tumbler 50 relative to the Stationary feed chute 42. A mounting plate 45 is provided on and surrounds feed head 48 for attachment to tumbler 50. Mounting plate 45 has mounting holes 46 as shown in FIG. 5(*b*) which are configured to receive mounting pins 108 carried by frame member 100 and passing through the flange 51 of tumbler 50, as seen in FIGS. 6(*b*) and 10, discussed below. The feed head 48 can be releasably attached to tumbler 50 by aligning holes 46 formed in feed head mounting flange 45 with holes 59 formed in tumbler flange 51, then passing pins 108 of frame member 100 through holes 46 and 59. The tumbler 50 is rotated and feed head 48 rotates with the tumbler 50 relative to feed chute 42. The feed head 48 has an opening 49 through which product can pass when the feed head 48 is in the position of FIGS. 4(*b*) and 4(*d*), as will be discussed below.

As shown in FIGS. 6(*a*) and 6(*b*), tumbler 50 is preferably in the form of a hollow cylindrical member having a helical rail or ledge member 52 extending along the interior surface from one end of the tumbler to the other. The helical rail 52 is shown in broken lines in FIG. 6(*a*), while in FIGS. 4(*a*)–(*d*) and 10 the rail 52 is shown schematically by dashed diagonal lines. The helical rail 52 extends radially inward from the tumbler wall and has an inner edge 53 which is spaced from the tumbler axis to allow insertion of a seasoning dispenser 70 as will be explained below. As stated above, one end of tumbler 50 is provided with a flange 51 for detachably securing the feed head 48 thereto. The tumbler 50 further includes a plurality of elongate agitator members 57 extending axially therethrough adjacent the inner surface of the cylindrical member, the agitator members 57 preferably being disposed between adjacent flights of helical member 52 as will be discussed below.

FIGS. 4(a) and 4(c) show volumetric feeder 40 with the tumbler 50 attached to feed head 48, the feeder 40 being in a fill mode as the feed chute 42 receives product 14 in its upper end 44 and the product accumulates in the feed head 48. When the tumbler 50 and feed head 48 are in the position of FIGS. 4(a) and 4(c), the feed head 48 is filled with one portion or charge of product 14. As the tumbler 50 rotates, the feed head 48 also rotates relative to feed chute 42, preferably 180° from the position of FIGS. 4(a) and 4(c) to the position shown in FIGS. 4(b) and 4(d). This rotation causes opening 49 of feed head 48 to face downward, whereby gravity causes feed head 48 to dump the volumetric portion 16 into the tumbler 50, after which the feed head 48 rotates further back to the product-receiving position of FIGS. 4(a) and 4(c). The attachment of feed head 48 to tumbler 50 and the cooperation therebetween insures that the volumetric portion 16 is developed with each rotation of the tumbler 50, thereby establishing a controlled rate of product delivered through the tumbler, which rate is proportional to the rotational speed of the tumbler. The product portion 16 deposited into the tumbler 50 is contained within a flight of the helical rail 52 and moves from the end of the tumbler 50 connected to the feed head 48 to the opposite end of the tumbler 50, traveling one flight for each rotation of the tumbler. The product is seasoned within the tumbler and upon exit therefrom the product is weighed and packaged, as will be further described below. As stated above, it is also possible to use the packaging lines 130 of the present invention for packaging unseasoned product by not utilizing the seasoning dispenser 70, in which case the product portions pass through tumbler 50 to the weighing device 131 without being seasoned.

Figure 10:
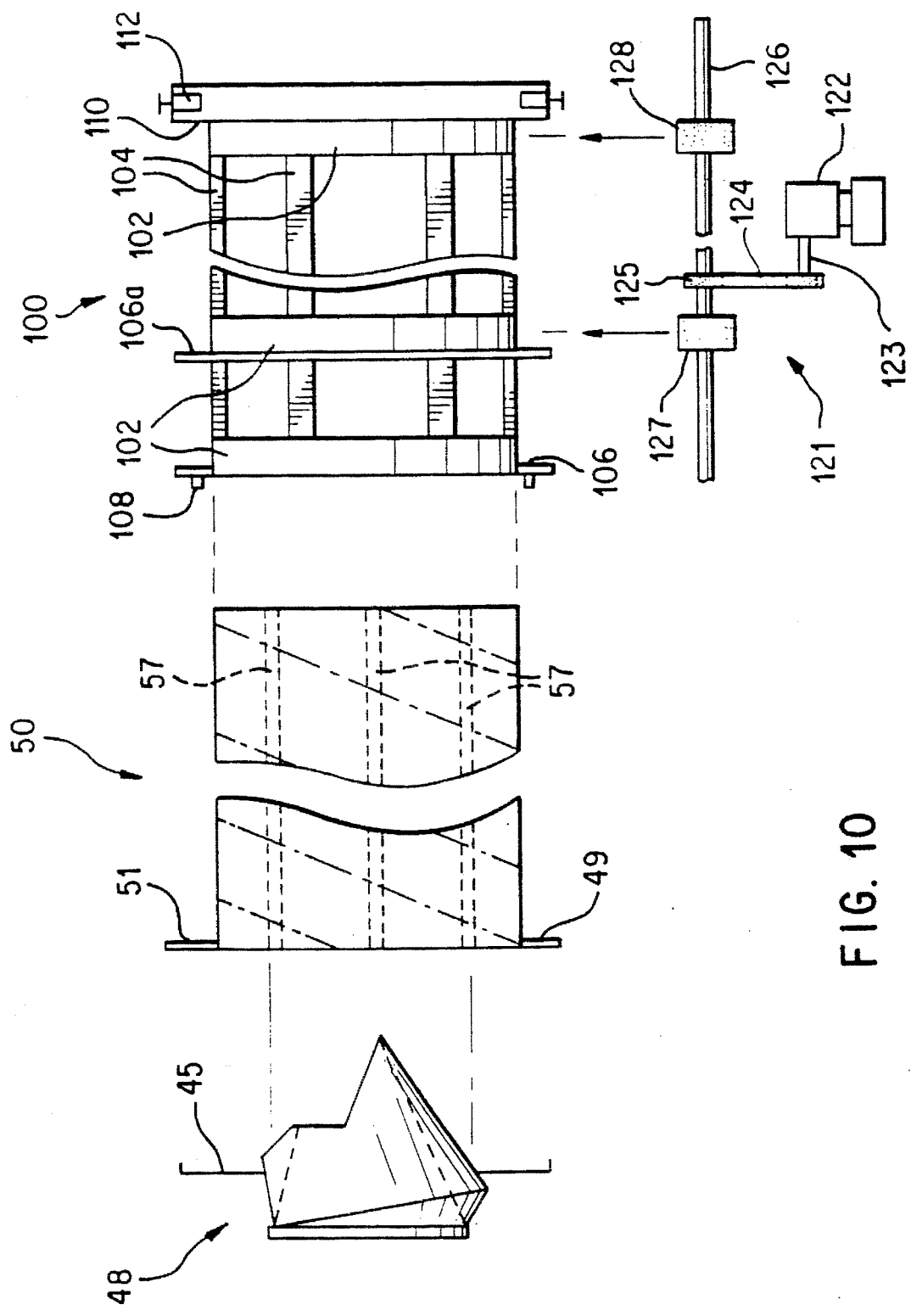
FIG. 10 is an exploded view of the feed head and tumbler including the tumbler drive means.
Figure 11:
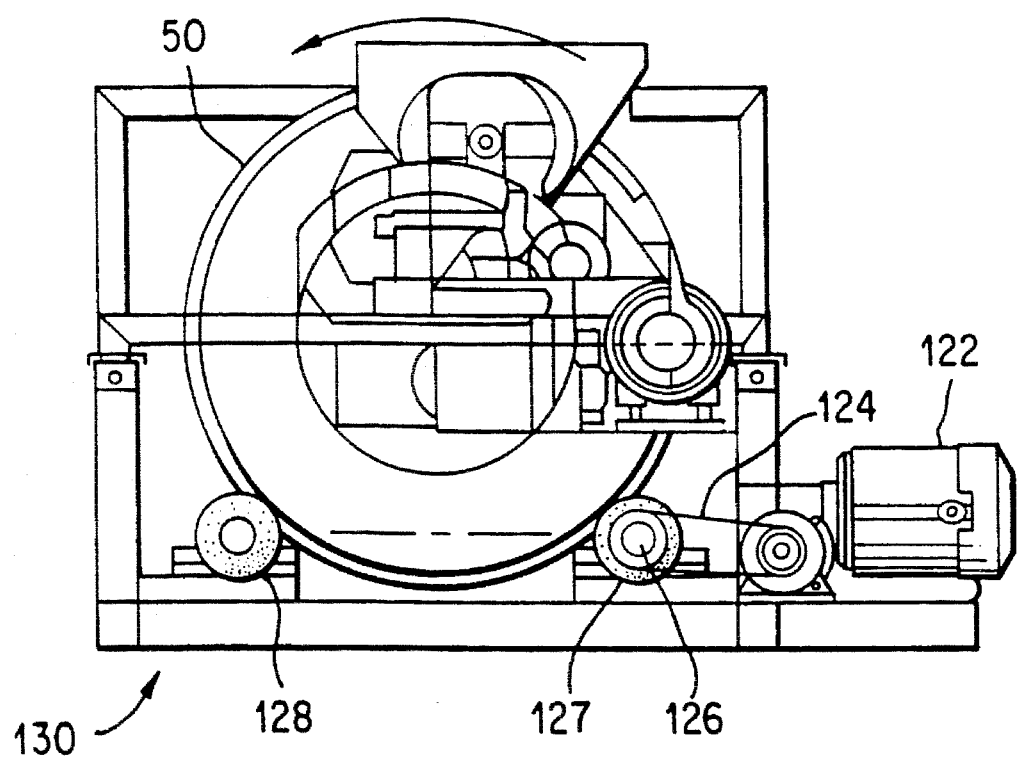
FIG. 11 is an end view of the tumbler and tumbler drive means.

With reference to FIGS. 10 and 11, the drive means for rotating tumbler 50 will be described. A frame member 100 is preferably cylindrical and adapted to receive tumbler 50 therein and includes a plurality of, e.g. three, cylindrical support members 102 and a plurality of horizontal support members 104 arranged to form a lattice like cylindrical frame designed to house tumbler 50. Two of the cylindrical support members 102 are engaged by drive rollers 127 as will be discussed below. Frame member 100 includes end flanges 106,110 which aid in securing support members 104 together. The end flange 106 is provided with the aforementioned pins 108, e.g. three pins, configured for engagement with a corresponding number of mounting holes 46 formed in the mounting flange 45 of feed head 48. As seen in FIG. 10, tumbler 50 is inserted in frame member 100 with pins 108 passing through a corresponding number of apertures 59 formed in the flange 51 of tumbler 50. The mounting flange 45 of feed head 48 is then secured to the tumbler 50 and frame 100 by engaging pins 108 with mounting holes 46, the flange 51 of tumbler 50 being sandwiched between flange 106 of frame 100 and mounting flange 45 of feed head 48, and then securing the ends of pins 108 so as to maintain the elements together. The pins 108 can be any suitable attachment means including but not limited to screws, rivets or bolts.

Drive means 121 for rotating the tumbler 50 are shown in FIGS. 10 and 11 and include a motor 122 with suitable gearing having a drive shaft 123 which engages a drive belt 124 to operate a pulley 125. The pulley 125 is mounted on a shaft 126 which is rotated upon rotation of drive belt 124 by motor shaft 123. Also mounted on shaft 126 are drive rollers 127 which engage two of the cylindrical support members 102. The drive rollers 127 engage the support member 102 disposed at the right end of frame 100 (opposite the feed head 48) and the support member 102 spaced inward from the left end, as indicated by the arrows of FIG. 10, to rotate the assembled frame 100, tumbler 50 and feed head 48. The support members 102 which are engaged by rollers 127 are provided with a flange extending outward from the tumbler surface for abutting the rollers to lock the tumbler-frame assembly from lateral movement. As seen in FIG. 10, flange 106a is provided on one support member 102 for abutting one roller 127, and end flange 110 is adjacent another support member 102 for abutting the other drive roller 127.

As shown in FIG. 11, the drive rollers 127 are preferably disposed on a support structure 130 with a set of idler rollers 128 opposite the drive rollers 127. The idler rollers 128 cooperate with drive rollers 127 to rotatably support tumbler 50 and frame 100. Optionally, the tumbler 50 can directly carry support members 102, 104 and the flanges which comprise frame 100 so that drive rollers 127 and idler rollers 128 engage the tumbler 50 itself instead of utilizing a separate frame member. The end of the frame 100 with flange 110 is provided with a plurality of adjustable centering blocks 112, e.g. three, each of which includes a rotatable member that can be moved radially inward from the top leg of flange 110 to engage the outer surface of tumbler 50 to properly position and center tumbler 50.

The feed chute 42, as seen in FIG. 3, has attached thereto a plurality of product height sensors 60, 62 and 64. These sensors, which are known in the art and send an appropriate signal upon sensing a specific parameter, are positioned at different heights along the feed chute 42 so as to indicate the level of product within the feed chute 42. In operation, when the product level falls below the height of the central sensor 62, the sensor 62 sends a signal to open the slide gate 18 of one of the distribution conveyors 24, 26 to allow product to drop from the conveyor into the upper end 44 of the feed chute 42. When the product level is restored to the level of uppermost sensor 60, that sensor sends a signal to close the slide gate 18 to stop delivery of product from the distribution conveyors 24, 26. This cycle of operation repeats until the operator stops the system. In addition, should the product level fall below lowermost sensor 64, that sensor signals the system to shut down because product levels which are this low will adversely affect control of the volumetric product portions developed by the rotating tumbler 50.

The cooperation of the flighted tumbler 50 with the feed chute 42 and feed head 48 produces a series of distinct product portions with each portion contained within a flight of the tumbler. This arrangement provides highly controlled portioning of the product with each portion maintained substantially separate from the rest of the product. The present invention further includes means for seasoning the product within the tumbler 50 so that each packaging line 130 can be selectively controlled to output unseasoned or seasoned product types. Unlike the prior art, in which the package output is dictated or constrained by the product type carried by the distribution conveyors and delivered to the packaging lines, the present invention allows seasoning of the product at individual packaging lines in each packaging department. Unseasoned product can be delivered by the distribution conveyors to packaging lines at which the product can be independently seasoned, thus providing many more packaging possibilities and a much wider range of plant scheduling flexibility than the prior art approach of only running two distribution conveyors with one type of product carried by each.

As stated above, the present invention includes means 133 at selected packaging lines 130 for controlled seasoning of product. In a preferred embodiment, such means includes a seasoning dispenser indicated generally at 70 in FIGS. 3 and 7(*a*)–(*b*). The seasoning dispenser 70 is designed to be positioned within the flighted tumbler 50 and can be adjusted to a particular dispensing rate to achieve a desired seasoning level. The dispenser 70 is disposed such that the field of dispensed seasoning is uniformly positioned above the product in flighted tumbler 50 to achieve appropriate mixing action to provide the desired seasoning levels and coverage on the product. As shown in FIG. 3, the dispenser 70 is provided with linear bearings 71 which move along rails 73 to permit the dispenser 70 to be inserted into and removed from the tumbler 50.

Referring to FIGS. 3 and 7–9, the seasoning dispenser 70 according to a first embodiment of the present invention includes a seasoning bin 72 in the form of a box with a front wall 74, a rear wall 76, two side walls 78 and a perforate bottom 80. The bin 72 is closed by a cover 75 and the perforate bottom 80 is preferably in the form of a screen with a multiple hole pattern, the size of the pattern depending on the characteristics of the desired seasoning powder. Seasoning bin 72 is in communication with a seasoning bulk hopper 90 and an auger 91 delivers seasoning from the hopper 90 to the interior of the bin 72. The auger 91 is shown positioned within the seasoning bin 72 in FIG. 7(*b*). The auger 91, which is driven by suitable means (not shown), is itself conventional and serves to deliver seasoning to the dispenser 70. Disposed within the seasoning bin 72, preferably closely adjacent perforate bottom 80, are first and second drive rods 82, 84. Drive rods 82, 84 are preferably disposed within the seasoning bin 72 so that the end of each rod 82, 84 is flush with the front wall 74 of bin 72 when the rods 82, 84 are fully retracted, i.e. positioned to the right in FIG. 7(*a*). The end of each drive rod 82, 84 extends outward past the front wall 74 of bin 72 when the rods 82, 84 are positioned to the left in FIG. 7(*a*). The drive rods 82, 84 are connected to drive means, e.g. a motor 100, in a phase-lagged manner, i.e. the phase of the movement of one drive rod lags behind the movement of the other drive rod. An example of a phase-lagged connection is the crankshaft device 86 which is engaged through suitable gearing 88 to the drive portion of motor 100. The crankshaft device 86, in a manner known to the art, facilitates oscillatory movement of drive rods 82, 84 in the aforementioned phase-lagged manner for reasons discussed below.

Figure 8:
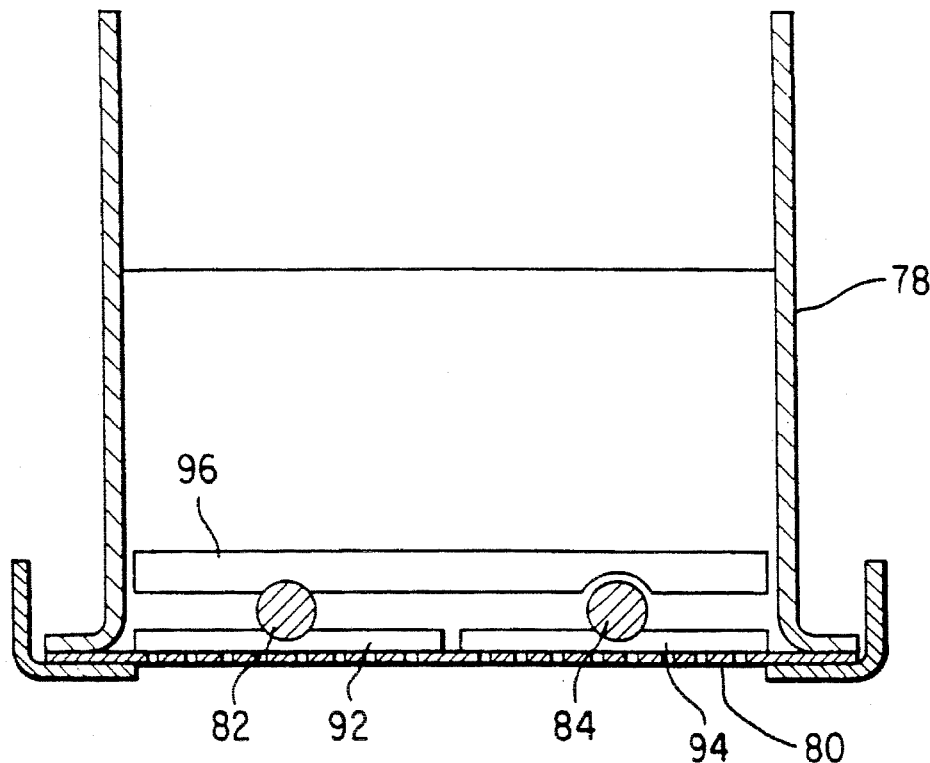
FIGS. 8 and 9 are sectional views taken along lines 8—8 and 9—9, respectively, of FIG. 7(a).
Figure 9:
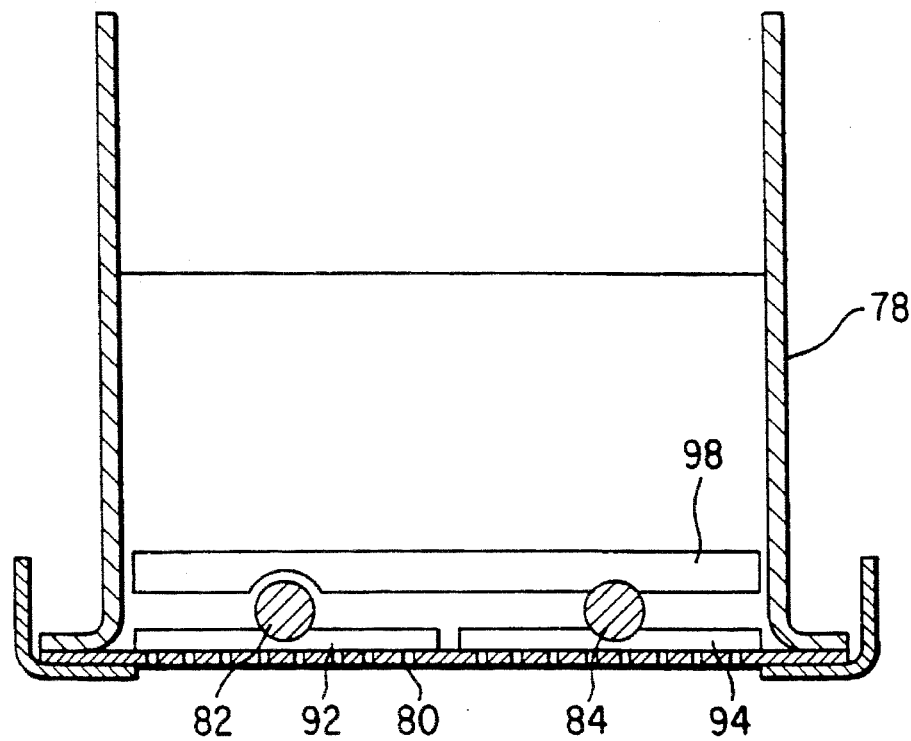

As best seen in FIGS. 8 and 9, the drive rods 82, 84 have sifting rods or bars 92, 94 respectively attached thereto. The sifting rods are connected transversely, preferably perpendicularly, to a lower portion of each of the drive rods 82, 84 and extend slightly above the perforate bottom 80. Drive rods 82, 84 are driven in an oscillatory fashion by the crankshaft device 86 so seasoning powder is continuously dispensed. As one drive rod reaches the end of the seasoning bin and momentarily stops to reverse direction, a corresponding "dead time" occurs because that drive rod is not moving and thus is not dispensing seasoning. By utilizing two drive rods that are phase-lagged, when one rod reaches the position at which it reverses direction the other rod is still moving its sifter rods across the bin and dispensing seasoning. By phase-lagging the rods a difference of 90°, one drive rod is at maximum velocity when the other drive rod is momentarily stopped to reverse direction.

An additional feature of the present invention is the provision of one or more season leveling rods or bars 96, 98 on the drive rods 82, 84. These season leveling rods 96, 98 are respectively disposed on an upper portion of the drive rods 82, 84, as shown in FIGS. 8 and 9. The leveling rods 96, 98 extend transversely to drive rods 82, 84 and are positioned above the drive rods and sifter rods 92, 94 to continuously level the seasoning within the dispenser bin 72. In a preferred embodiment, a plurality of leveling rods 96, 98 is carried by each drive rod, but those skilled in the art will recognize that the leveling rods can be carried by only one drive rod. The seasoning dispenser of the present invention further includes a seasoning level detection member 102 in the form of a plate having high and low level sensors 104, 106. The detection member 102 is positioned within an opening 109 formed in the seasoning bin 72, as shown in FIGS. 7(*a*) and (*b*), and will emit an appropriate signal, e.g. to shut down the system, upon sensing a preselected seasoning level. The seasoning dispenser 70 also includes couplings 110 which secure drive rods 82, 84 to the crankshaft device 86 in a detachable manner. Latch members 112 are provided for disassembling the seasoning bin 72 from the portion of the dispenser 70 which houses the drive means and crankshaft device, such disassembly occurring along the line 114.

As seen in FIG. 3, the seasoning dispenser 70 is adapted to be positioned within the tumbler 50 with the perforate bottom 80 facing the product. The seasoning dispenser 70, shown in broken lines in FIG. 6(*b*), preferably is positioned within tumbler 50 so as to be slightly off center, i.e. not centered with respect to the longitudinal axis of tumbler 50, so that seasoning of the product occurs as the product is tumbling and turning over as described below. As tumbler 50 rotates, the controlled product portions move along the helical flight 52 within the tumbler 50 away from feed head 48, with seasoning dispenser 70 operating to evenly distribute the seasoning on the product portions. As seen in FIGS. 6(*b*), the agitator bars 57 cause the product portion to move upward within the flight and along the interior of tumbler 50 until gravity causes the product to fall back down. This tumbling motion provides improved product seasoning coverage which cooperates with the seasoning dispenser 70 to produce consistent seasoning levels on the controlled product portions. The agitator bars 57 serve to evenly distribute seasoning all around the product, e.g. on all sides of the chip or snack forming the product portion. The seasoned product portions pass through the tumbler 50 and fall onto the dispersion cone 55 of a conventional statistical weighing device 131 which passes the portions to a bag or package-making device 132 known in the art.

With the present invention, it is possible to match the amount of seasoning dispensed by dispenser 70 with the controlled "throughput" weight of product, i.e. the amount of product passing through tumbler 50 in a given time, thereby providing improved results in consistency of seasoning weight per product weight as well as seasoning coverage of the product.

While a preferred embodiment of the foregoing present invention has been set forth for purposes of illustration, the foregoing description should not be deemed a limitation of the invention herein. Accordingly, various modifications, adaptations, and alternatives may occur to one skilled in the art without departing from the spirit and scope of the invention.

What is claimed is:

1. An apparatus for dispensing material, comprising:

a feed chute for conveying material, said feed chute having an upper end and a lower end;

a feed head in communication with the lower end of said feed chute and being rotatable with respect to the feed chute, said feed head having a first opening into which material passes from the feed chute and a second opening out of which the material passes from the feed head;

a rotatable tumbler connected to the feed head; and a device for rotating the tumbler;

whereby rotation of the tumbler causes rotation of the feed head and rotation of the feed head to a first extent causes material to pass into the feed head and rotation of the feed head past the first extent dispenses the material from the feed head into the tumbler.

2. An apparatus as claimed in claim 1, wherein a portion of the material having a predetermined size passes from the feed chute into the feed head through the first opening when the tumbler is rotated to the first extent, and said portion passes from the feed head through the second opening into the tumbler when the tumbler is rotated past the first extent so as to dispense said portion having a predetermined size into the tumbler.

3. An apparatus as claimed in claim 2, wherein said tumbler has separate sections for receiving the material from the feed head in portioned amounts.

4. An apparatus as claimed in claim 1, wherein said tumbler includes a helical member extending radially inward along the tumbler interior from one end of the tumbler to another end of the tumbler, with each flight of the helical member cooperating with the tumbler interior to form a section which receives a portioned amount of the material.

5. An apparatus as claimed in claim 4, wherein said tumbler includes a plurality of agitating members extending axially through the tumbler along an interior surface thereof.

6. An apparatus as claimed in claim 4, wherein the portioned amount of product moves along the tumbler from one flight to another as the feed head is repeatedly rotated.

7. An apparatus as claimed in claim 1, wherein said feed head and said feed chute are disposed in a telescoping relationship and when rotated to a first position the feed head receives an amount of the material from the feed chute, and when further rotated to a second position the feed head conveys the amount of material to the tumbler.

8. An apparatus for dispensing portions of material, the apparatus comprising:

a feed chute for conveying material, the feed chute receiving material from a supply of the material and discharging the received material into a feed head which is in communication with the feed chute;

wherein the feed head is rotatable and includes a substantially hollow member with a first end and a second end and a material-receiving portion, the first end of the feed head receiving material discharged from a lower end of the feed chute when the feed head is located at a first position with said material passing into the material-receiving portion of the feed head; and wherein the second end of the feed head includes an outlet opening which dispenses said material from the material-receiving portion of the feed head when the feed head is rotated from said first position to a second position.

9. An apparatus according to claim 8, wherein the outlet opening of the feed head is disposed substantially opposite to the material-receiving portion of the feed head.

10. An apparatus according to claim 8, wherein the outlet opening of the feed head opens in a substantially upward direction when the feed head is in the first position, and the outlet opening of the feed head opens in a substantially downward direction when the feed head is in the second position.

11. An apparatus according to claim 10, wherein the material-receiving portion of the feed head includes a surface that is directed substantially upward when the feed head is in the first position to prevent the material received from the feed chute from exiting the outlet opening of the feed head.

12. An apparatus according to claim 10, wherein the second end of the feed head is closed except for the outlet opening and limits the amount of material that passes into the second end when the feed head is in the first position.

13. An apparatus according to claim 8, wherein the feed head is generally funnel-shaped and the outlet opening is formed as a cut-out section of the funnel.

14. An apparatus for dispensing portioned amounts of material having a consistent size, the apparatus comprising:

a supply member for receiving material from a supply of the material and for conveying the material to a feed head;

the feed head being rotatable;

a drive device for rotating the feed head;

the feed head having a section which is filled with a portioned amount of the material from the supply member as the feed head is rotated by the drive device, and the feed head having an outlet which dispenses the portioned amount of material as the feed head continues to be rotated by the drive device, the filling of the feed head with said material generally taking place during rotation of the feed head except while the feed head is dispensing the portioned amount of material; and wherein continuous rotation of the feed head causes the feed head to repeatedly be filled with individual portioned amounts of material and repeatedly dispense individual portioned amounts of the material.

* * * * *